(12) United States Patent (10) Patent No.: US 10,976,968 B2
Hirokawa (45) Date of Patent: Apr. 13, 2021

(54) INFORMATION PROCESSING APPARATUS, METHOD, AND NON-TRANSITORY COMPUTER READABLE RECORDING MEDIUM THAT STORES PROGRAM

(71) Applicant: KYOCERA DOCUMENT SOLUTIONS INC., Osaka (JP)

(72) Inventor: Osamu Hirokawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/850,177

(22) Filed: Apr. 16, 2020

(65) Prior Publication Data
US 2020/0341697 A1 Oct. 29, 2020

(30) Foreign Application Priority Data
Apr. 26, 2019 (JP) .............................. JP2019-085411

(51) Int. Cl.
*G06F 3/12* (2006.01)
(52) U.S. Cl.
CPC .......... *G06F 3/1204* (2013.01); *G06F 3/1256* (2013.01); *G06F 3/1257* (2013.01)
(58) Field of Classification Search
CPC ..... G06F 3/1204; G06F 3/1256; G06F 3/1257
USPC ....................................... 358/1.13
See application file for complete search history.

(56) References Cited

U.S. PATENT DOCUMENTS 9,678,696 B2 * 6/2017 Martin ..................... G06F 3/121
9,729,746 B1 * 8/2017 Hong ................. H04N 1/00347

FOREIGN PATENT DOCUMENTS

JP 2010194728 A 9/2010

* cited by examiner

*Primary Examiner* — Miya J Williams
*Assistant Examiner* — Darryl V Dottin
(74) *Attorney, Agent, or Firm* — Li & Cai Intellectual Property (USA) Office

(57) ABSTRACT

An information processing method includes: storing, for each user, a first image forming apparatus usually used, a print setting usually used in the first image forming apparatus, and a first operational procedure, the first operational procedure being a procedure for selecting the print setting via a user interface of the first image forming apparatus; receiving authorization information of a user from a second image forming apparatus; and where the first operational procedure of a user specified based on the authorization information is different from a second operational procedure, the second operational procedure indicating a procedure for selecting the print setting of the specified user via a user interface of the second image forming apparatus, sending guide information to the second image forming apparatus, the guide information indicating guide-display of the second operational procedure.

4 Claims, 6 Drawing Sheets

| 341 | 342 | 343 | 344 |
|---|---|---|---|
| Authorization information | Image forming apparatus usually used | Print setting usually used | First operational procedure |
| ... | ... | ... | ... |
| ... | ... | ... | ... |
| ... | ... | ... | ... |

340

| 346 | 347 | 348 |
|---|---|---|
| Identifier information | Model information | Second operational procedure |
| ... | ... | ... |
| ... | ... | ... |
| ... | ... | ... |

INFORMATION PROCESSING APPARATUS, METHOD, AND NON-TRANSITORY COMPUTER READABLE RECORDING MEDIUM THAT STORES PROGRAM

CROSS-REFERENCE TO RELATED PATENT APPLICATION

This application claims the benefit of Japanese Priority Patent Application JP 2019-085411 filed Apr. 26, 2019, the entire contents of which are incorporated herein by reference.

FIELD OF THE DISCLOSURE

The present disclosure relates to an information processing apparatus. The present disclosure further relates to an information processing method executable by the information processing apparatus. The present disclosure further relates to a non-transitory computer readable recording medium that stores a program that causes a computer to execute the information processing method.

BACKGROUND OF THE DISCLOSURE

There is known a technology for providing an appropriate operational procedure to a user where an operation input in a device by the user is different from a predetermined operational procedure.

SUMMARY OF THE DISCLOSURE

It is desirable, when a user uses an image forming apparatus which requires an operational procedure different from an operational procedure that the user usually uses, to operate the image forming apparatus without reading a manual.

According to an embodiment of the present disclosure, there is provided an information processing apparatus, including:

a storage device configured to store, for each user, a first image forming apparatus usually used, a print setting usually used in the first image forming apparatus, and a first operational procedure, the first operational procedure being a procedure for selecting the print setting via a user interface of the first image forming apparatus;

a communication device configured to receive authorization information of a user from a second image forming apparatus; and a controller circuit configured to, where the first operational procedure of a user specified based on the authorization information is different from a second operational procedure, the second operational procedure indicating a procedure for selecting the print setting of the specified user via a user interface of the second image forming apparatus, controls the communication device to send guide information to the second image forming apparatus, the guide information indicating guide-display of the second operational procedure.

According to an embodiment of the present disclosure, there is provided an information processing method, including:

storing, for each user, a first image forming apparatus usually used, a print setting usually used in the first image forming apparatus, and a first operational procedure, the first operational procedure being a procedure for selecting the print setting via a user interface of the first image forming apparatus;

receiving authorization information of a user from a second image forming apparatus; and where the first operational procedure of a user specified based on the authorization information is different from a second operational procedure, the second operational procedure indicating a procedure for selecting the print setting of the specified user via a user interface of the second image forming apparatus, sending guide information to the second image forming apparatus, the guide information indicating guide-display of the second operational procedure.

According to an embodiment of the present disclosure, there is provided a non-transitory computer readable recording medium that stores a program that causes a computer to execute an information processing method including:

storing, for each user, a first image forming apparatus usually used, a print setting usually used in the first image forming apparatus, and a first operational procedure, the first operational procedure being a procedure for selecting the print setting via a user interface of the first image forming apparatus;

receiving authorization information of a user from a second image forming apparatus; and where the first operational procedure of a user specified based on the authorization information is different from a second operational procedure, the second operational procedure indicating a procedure for selecting the print setting of the specified user via a user interface of the second image forming apparatus, sending guide information to the second image forming apparatus, the guide information indicating guide-display of the second operational procedure.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 5 shows an example of data structures of information stored in the storage device.

DETAILED DESCRIPTION OF THE EXEMPLARY EMBODIMENTS

Hereinafter, an embodiment of the present disclosure will be described with reference to the drawings.

1. IMAGE FORMING SYSTEM

Figure 1:
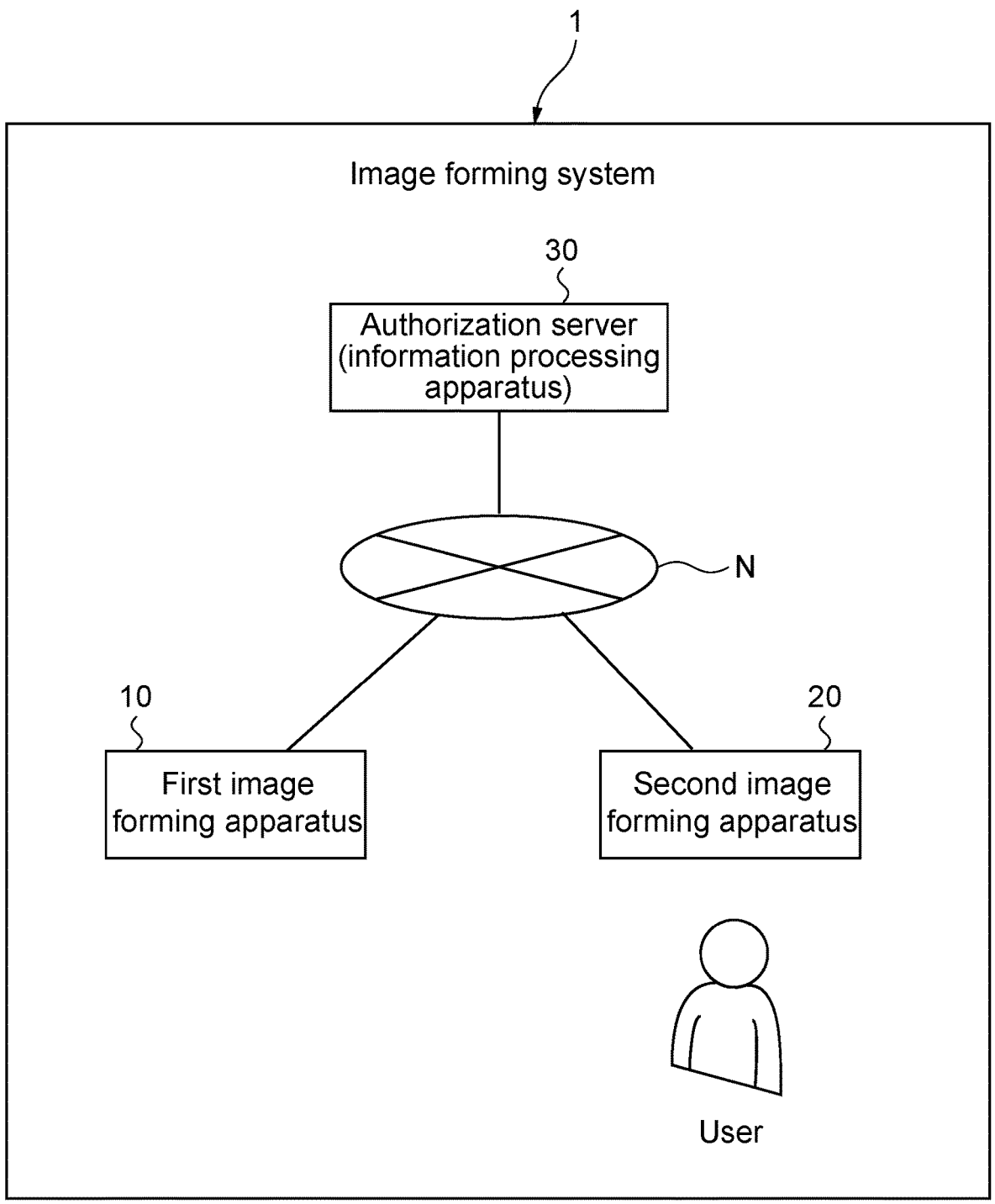
FIG. 1 shows an image forming system according to an embodiment of the present disclosure.

FIG. 1 shows an image forming system according to an embodiment of the present disclosure.

The image forming system 1 includes the first image forming apparatus 10, the second image forming apparatus 20, and the authorization server 30. The first image forming apparatus 10 and the second image forming apparatus 20 are, for example, Multifunction Peripherals, i.e., MFPs. Each of the first image forming apparatus 10 and the second image forming apparatus 20 is communicably connected to the authorization server 30 via the network N.

The image forming system 1 may include other image forming apparatuses in addition to the first image forming apparatus 10 and the second image forming apparatus 20. The network N may include some kinds of communication networks including the Internet, and may be a combination of multiple communication networks. Although not the limitation, the image forming system 1 may be configured as a network print service that uses an MFP at a convenience store.

A user (end user) of the image forming system 1 usually and frequently uses the first image forming apparatus 10, and knows its user interface well. The user wants to use the second image forming apparatus 20. The user interface of the second image forming apparatus 20 is different from the user interface of the first image forming apparatus 10. An operational procedure for print setting, which is usually and frequently selected by the user, of the second image forming apparatus 20 may be different from an operational procedure for the same print setting of the first image forming apparatus 10. According to the present embodiment, even in such a case, the user may operate, without difficulty, the second image forming apparatus 20 without reading a manual.

2. HARDWARE CONFIGURATION OF IMAGE FORMING APPARATUS

Figure 2:
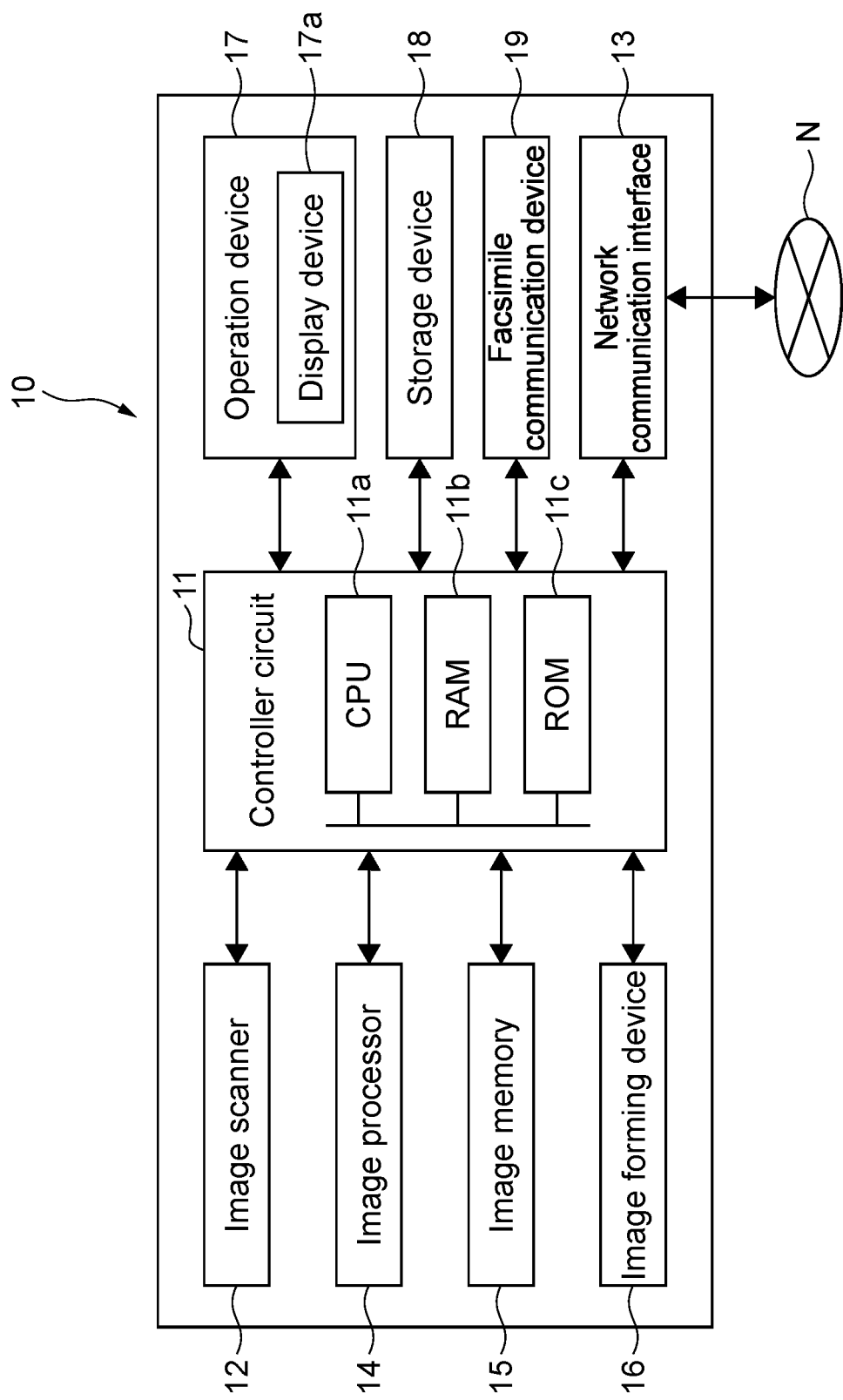
FIG. 2 shows a hardware configuration of a first image forming apparatus.

FIG. 2 shows a hardware configuration of a first image forming apparatus.

The first image forming apparatus 10 includes the controller circuit 11. The controller circuit 11 includes the CPU (Central Processing Unit) 11a, the RAM (Random Access Memory) 11b, the ROM (Read Only Memory) 11c, dedicated hardware circuits, and the like and performs overall operational control of the first image forming apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuit 11 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 11 performs operational control of the respective devices connected thereto and sends/receives signals and data to/from those devices. The operation device 17 (touch panel) is one mode of an input device. A sound input device including a microphone may be provided as an input device.

Figure 3:
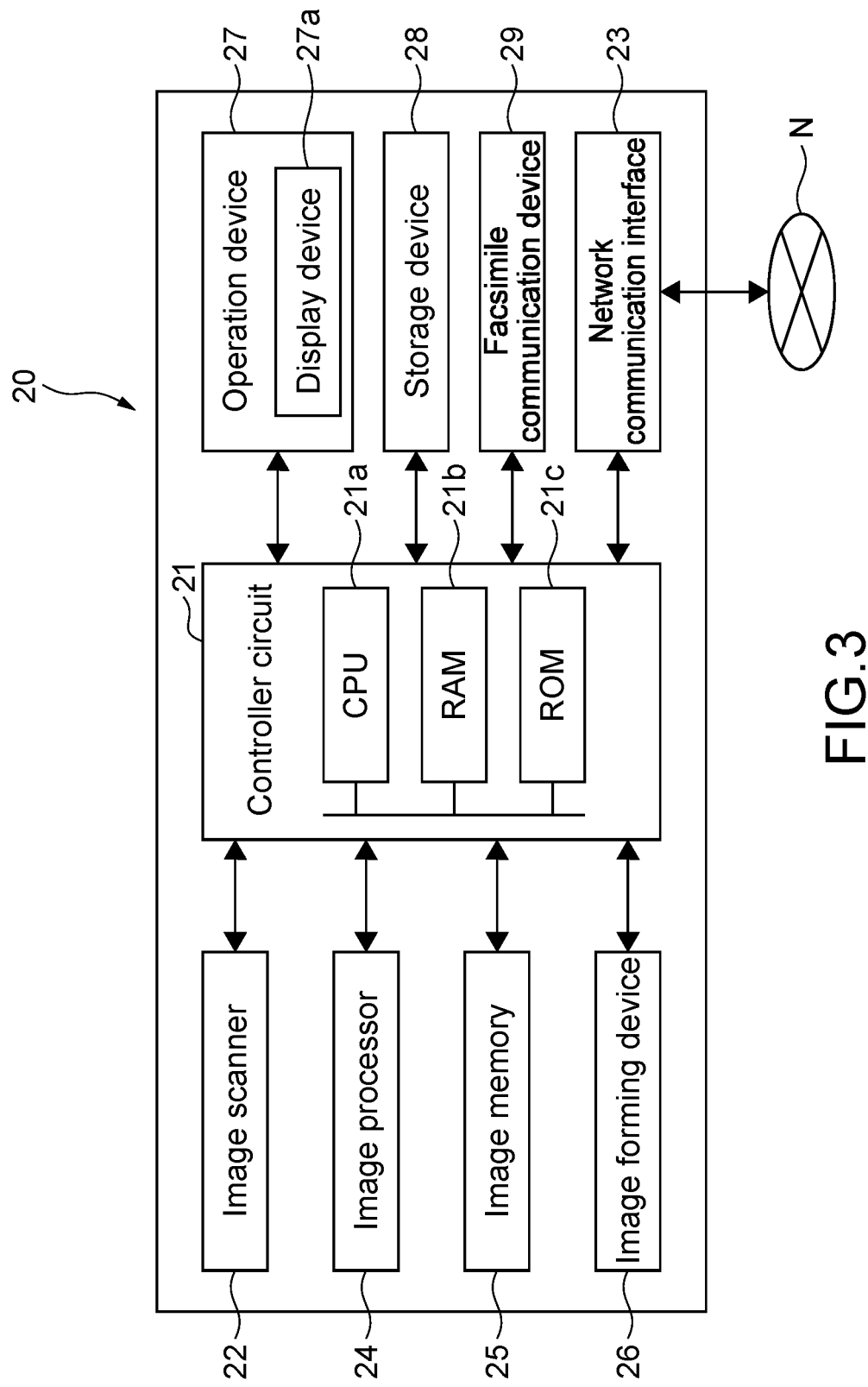
FIG. 3 shows a hardware configuration of a second image forming apparatus.

FIG. 3 shows a hardware configuration of a second image forming apparatus.

The hardware configuration of the second image forming apparatus 20 is similar to the hardware configuration of the first image forming apparatus 10. Similar to the first image forming apparatus 10, the second image forming apparatus 20 includes the controller circuit 21. The controller circuit 21 includes the CPU (Central Processing Unit) 21a, the RAM (Random Access Memory) 21b, the ROM (Read Only Memory) 21c, dedicated hardware circuits, and the like and performs overall operational control of the second image forming apparatus 20. The CPU 21a loads information processing programs stored in the ROM 21c in the RAM 21b and executes the information processing programs. The ROM 21c is a nonvolatile memory that stores programs executable by the CPU 21a, data, and the like. The ROM 21c is an example of a non-transitory computer readable recording medium.

The controller circuit 21 is connected to the image scanner 22, the image processor 24 (including GPU (Graphics Processing Unit)), the image memory 25, the image forming device 26 (printer), the operation device 27 including the display device 27a (touch panel), the large volume nonvolatile storage device 28 such as an HDD (Hard Disk Drive) or an SSD (Solid State Drive), the facsimile communication device 29, the network communication interface 23, and the like. The controller circuit 21 performs operational control of the respective devices connected thereto and sends/receives signals and data to/from those devices. The operation device 27 (touch panel) is one mode of an input device. A sound input device including a microphone may be provided as an input device.

Since the platform of the first image forming apparatus 10 is different from the platform of the second image forming apparatus 20, the user interface for a user of the operation device 27 is different from the user interface of the operation device 17.

3. HARDWARE CONFIGURATION OF AUTHORIZATION SERVER

Figure 4:
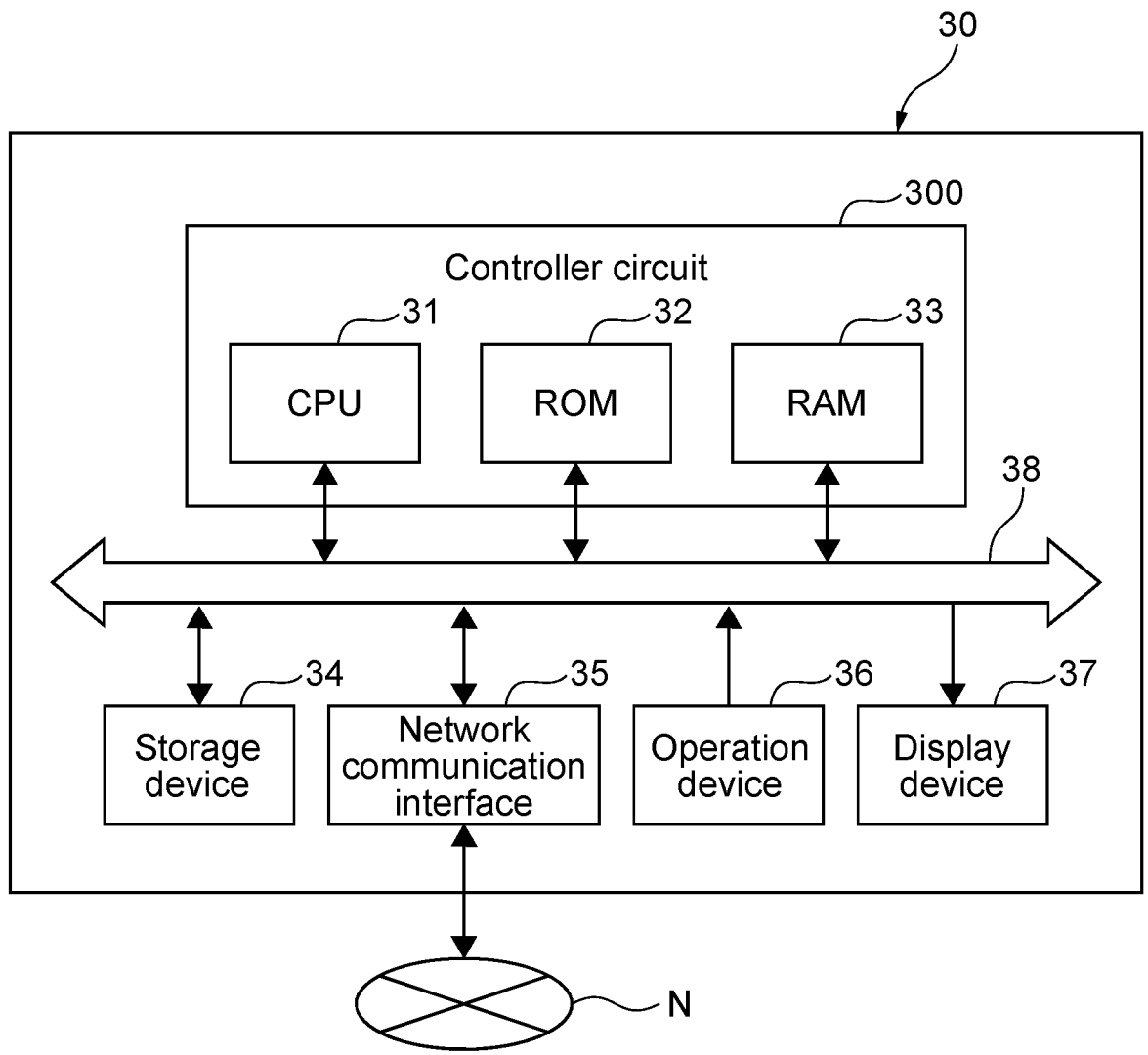
FIG. 4 shows a hardware configuration of an authorization server.

FIG. 4 shows a hardware configuration of an authorization server.

The authorization server 30 includes the CPU 31, the ROM 32, the RAM 33, the storage device 34, which is a large-volume nonvolatile memory such as an HDD or an SSD, the network communication interface 35, the operation device 36, and the display device 37, and the bus 38 connecting them to each other.

The controller circuit 300 includes the CPU 31, the ROM 32, and the RAM 33. The CPU 31 loads information processing programs stored in the ROM 32 in the RAM 33 and executes the information processing programs. The ROM 32 stores programs executable by the CPU 31, data, and the like nonvolatile. The ROM 32 is an example of a non-transitory computer readable recording medium.

In the controller circuit 300 of the authorization server 30, the CPU 31 loads information processing programs such as a platform stored in the ROM 32 in the RAM 33 and executes the information processing programs to operate as the "controller circuit".

Controlled by the controller circuit 300, the network communication interface 35 operates as the "communication device". The network communication interface 35 receives, from an image forming apparatus (in the present embodiment, the second image forming apparatus 20) operated by a user, authorization information of the user, identifier information of the second image forming apparatus 20, and information of a variable item selected by the user via the user interface of the second image forming apparatus 20. Further, the network communication interface 35 sends, to the second image forming apparatus 20, guide information indicating guide-display of an operational procedure of the second image forming apparatus 20.

Controlled by the controller circuit 300, the storage device 34 operates as the "storage device". The storage device 34 stores the "information for each user" 340 and the "information for each image forming apparatus" 345.

FIG. 5 shows an example of data structures of information stored in the storage device.

The "information for each user" 340 includes the authorization information 341, the "image forming apparatus usually used" 342 by the user, the "print setting usually used" 343 by the user in the image forming apparatus usually used, and the "first operational procedure" 344, which indicates a procedure for selecting the print setting via the user interface of the image forming apparatus usually used by the user. In the present embodiment, in FIG. 1, the first image forming apparatus 10 is the "image forming apparatus usually used" 342 by the user. The controller circuit 300 registers the "information for each user" 340 in the storage device 34.

The "information for each image forming apparatus" 345 stores the identifier information 346, the model information 347, and the second operational procedure 348. The model information 347 is information for specifying the model of an image forming apparatus. The model information 347 thereby specifies the user interface used in the image forming apparatus. The second operational procedure 348 is information indicating a procedure for selecting one of multiple variable items via the user interface. The second operational procedure 348 is stored for each of various print settings.

Further, the storage device 34 stores, for each user, the second operational procedure 348 corresponding to the "print setting usually used" 343. The authorization server 30 thereby obtains, based on the authorization information 341 and the identifier information 346, the second operational procedure 348 corresponding to the print setting usually used 343 by the user specified based on the authorization information 341.

4. OPERATIONAL FLOW OF SECOND IMAGE FORMING APPARATUS AND AUTHORIZATION SERVER

Figure 6:
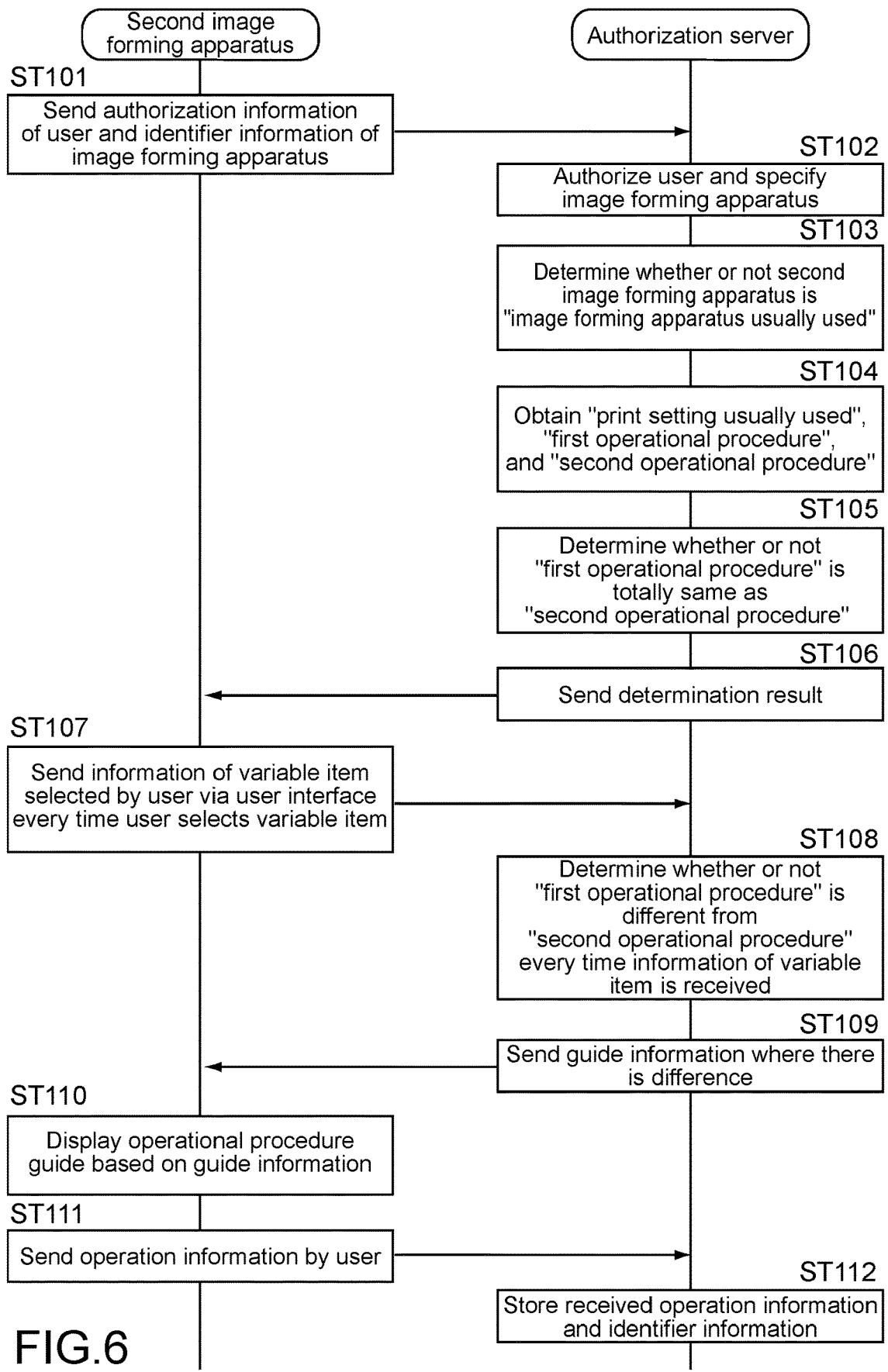
FIG. 6 shows an operational flow of the second image forming apparatus and the authorization server.

FIG. 6 shows an operational flow of the second image forming apparatus and the authorization server.

The second image forming apparatus 20 receives an operation input by a user. The second image forming apparatus 20 sends, to the authorization server 30, the authorization information 341 of the user and the identifier information 346 of the second image forming apparatus 20 (Step ST101).

The controller circuit 300 of the authorization server 30 specifies the user based on the received authorization information 341, and specifies the image forming apparatus based on the identifier information 346 (Step ST102). In the present embodiment, the second image forming apparatus 20 is specified by the authorization information 341.

Next, the controller circuit 300 of the authorization server 30 determines whether or not the second image forming apparatus 20 specified based on the identifier information 346 is the "image forming apparatus usually used" 342 by the user specified based on the authorization information 341 (Step ST103).

Where the second image forming apparatus 20 is the "image forming apparatus usually used" 342, the authorization server 30 notifies the second image forming apparatus 20 of that, and proceeds to the following Step ST111. In the present embodiment, as shown in FIG. 1 as a specific example, the "image forming apparatus usually used" 342 by the user is the first image forming apparatus 10. So the authorization server 30 proceeds to Step ST104.

Next, the controller circuit 300 of the authorization server 30 obtains, from the storage device 34, the "print setting usually used" 343 by the user specified based on the authorization information 341, and the first operational procedure 344 (Step ST104). Further, the controller circuit 300 obtains, from the storage device 34, the "second operational procedure" 348, which indicates the operational procedure for obtaining the "print setting usually used" 343 by the user via the user interface of the second image forming apparatus 20 specified based on the identifier information 346 (Step ST104).

Next, the controller circuit 300 of the authorization server 30 determines whether or not the first operational procedure 344 is totally the same as the second operational procedure 348 obtained in Step ST104 (Step ST105). For example, where the models are the same and the user interfaces are the same, the first operational procedure 344 is totally the same as the second operational procedure 348. In this case, the controller circuit 300 of the authorization server 30 notifies the second image forming apparatus 20 of that, and proceeds to the following Step ST111. Further, in this case, the second image forming apparatus 20 displays, on the display device 27a, a message such as "usual operation is acceptable" immediately before Step ST111.

Where the first operational procedure 344 is not totally the same as the second operational procedure 348, the authorization server 30 notifies (sends) the second image forming apparatus 20 of that (Step ST106). The second image forming apparatus 20 thereby obtains information that the first operational procedure 344 for the user is different from the second operational procedure 348, with which the second image forming apparatus 20 provides the print setting usually used 343 by the user.

Next, the second image forming apparatus 20 sends information of a variable item selected by the user via the user interface to the authorization server 30 every time the user selects a variable item (Step ST107).

Every time the network communication interface 35 receives the information of a variable item, the controller circuit 300 of the authorization server 30 determines whether or not the first operational procedure 344 is different from the second operational procedure 348 (Step ST108). Specifically, the controller circuit 300 of the authorization server 30 determines whether or not the operational procedure next to the variable item in the second operational procedure 348 is different from the operational procedure next to the variable item in the first operational procedure 344.

Where the controller circuit 300 of the authorization server 30 determines that the next operational procedure in the second operational procedure 348 is not different from the next operational procedure in the first operational procedure 344, the controller circuit 300 of the authorization server 30 stands by for receiving information of the next variable item. The controller circuit 300 of the authorization server 30 repeats Step ST107 and Step ST108 until the controller circuit 300 of the authorization server 30 determines that the first operational procedure 344 is different from the second operational procedure 348. Note that, where the user selects a variable item different from the "print setting usually used", the present operational flow will be finished since it is an exceptional processing.

Where the controller circuit 300 of the authorization server 30 determines that the next operational procedure in the second operational procedure 348 is different from the next operational procedure in the first operational procedure 344, the controller circuit 300 controls the network communication interface 35 to send guide information to the second image forming apparatus 20 (Step ST109). Here, the guide information is information for generating a display screen to be displayed on the display device 27a of the second image forming apparatus 20 for guiding the next procedure of the second operational procedure.

The controller circuit 21 of the second image forming apparatus 20 generates a display screen for guiding and displaying the next procedure of the second operational procedure based on the received guide information, and displays the display screen on the display device 27a (Step ST110).

After that, when the user's operation is finished, the second image forming apparatus 20 sends, to the authorization server 30, operation information indicating a series of variable items selected by the user, and the identifier information 346 of the second image forming apparatus 20 (Step ST111).

The authorization server 30 receives the operation information and the identifier information 346. The authorization server 30 specifies the second image forming apparatus 20 based on the identifier information 346. The authorization server 30 stores the "information for each user" 340 of the user (Step ST112). The controller circuit 300 may store the second image forming apparatus 20 as the "image forming apparatus usually used" 342 depending on the frequency. Further, the "information for each user" 340 includes, in addition to the "print setting usually used" 343, operation information executed by the user in the past. The authorization server 30 stores the operation information as the "information for each user" 340.

As described above, the controller circuit 300 stores the operation information, and, if necessary, updates the "image forming apparatus usually used" 342, the "print setting usually used" 343, and the first operational procedure 344 of the "information for each user" 340.

5. PRINT SETTING

Print setting of each image forming apparatus will be described additionally. The print setting is a series of setting such as "one A4 sheet, 2 pages, and duplex print". The print setting may further include option and finisher setting such as "send FAX".

In this example, the print setting includes multiple settings such as the "number of sheet(s)" setting—"one" and the "sheet size and type" setting—"A4 plain paper". The "variable item" is an item for selecting one of the multiple settings via the user interface. The "print setting" is obtained by selecting, by the user via a series of procedures, one of the multiple "variable items" displayed on the display device 27a.

The guide-display displayed on the display device 27a in Step ST110 is guide-display for selecting the "variable item". For example, the user interface of the "sheet size and type" setting displays variable items for sheets including "plain paper", "coated paper", and the like, and displays variable items for sizes including "A4", "B4", "A5", "B5", and the like. In this case, the guide-display includes highlights, arrows, and the like on the variable item "plain paper" and the variable item "A4". Further, the guide-display may include a message balloon with a sentence such as "select it for usual setting" near the variable items.

6. CONCLUSION

There is known a technology for providing an appropriate operational procedure to a user where an operation input in a device by the user is different from a predetermined operational procedure. However, this technology may not support operational procedures different from each other depending on devices.

When a user uses a device different from a device usually used by user and where operational procedures are different from each other, the user reads a device manual and confirms the operational procedure, which is burdensome.

(1) To the contrary, according to the present embodiment, the information processing apparatus registers, as the first operational procedure, print setting usually used by a user and a procedure for selecting the print setting. Where the operational procedure of the image forming apparatus (second image forming apparatus) actually used by the user is different from the first operational procedure, the information processing apparatus sends guide information to the second image forming apparatus. Therefore, when a user uses an image forming apparatus which requires an operational procedure different from an operational procedure that the user usually uses, to operate the image forming apparatus without reading a manual.

(2) According to the present embodiment, firstly, it is determined whether or not the image forming apparatus (second image forming apparatus) actually used by the user is the image forming apparatus usually used (first image forming apparatus) based on identifier information. Then, only if the image forming apparatus actually used is different from the image forming apparatus usually used, it is determined whether or not the first operational procedure is different from the second operational procedure. So, in a case where it is not necessary to determine the difference between the operational procedures, needless communication is not repeated, and the processing is made faster.

(3) According to the present embodiment, every time the user selects one of multiple variable items of the print setting, the image forming apparatus sends the user's operational procedure to the information processing apparatus (server). The information processing apparatus determine the difference of the operational procedure every time the user selects one variable item. As a result, from the variable item, with which the procedure is different from the first operational procedure of the first image forming apparatus usually used by the user, the user can watch the displayed guide information.

Although not the limitation, in the present embodiment, the user interface is a visual user interface. Alternatively, the user interface of each image forming apparatus may be an audio user interface.

It should be understood by those skilled in the art that various modifications, combinations, sub-combinations and alterations may occur depending on design requirements and other factors insofar as they are within the scope of the appended claims or the equivalents thereof

What is claimed is:
1. An information processing apparatus, comprising:
a storage device configured to store, for each user, a first image forming apparatus usually used, a print setting usually used in the first image forming apparatus, and a first operational procedure, the first operational procedure being a procedure for selecting the print setting via a user interface of the first image forming apparatus;
a communication device configured to receive authorization information of a user from a second image forming apparatus; and
a controller circuit, wherein the print setting is a combination of multiple variable items, the communication device is configured to receive information of one variable item selected by the specified user, the information being sent from the second image forming apparatus every time the specified user selects one variable item via the user interface of the second image forming apparatus, and the controller circuit is configured to, every time the communication device receives information of one variable item, determine whether or not a next operational procedure in the first operational procedure is different from a next operational procedure in a second operational procedure, the second operational procedure indicating a procedure for selecting the print setting of the specified user via a user interface of the second image forming apparatus, and the controller circuit is configured to, where the next operational procedure in the first operational procedure of a user specified based on the authorization information is different from the next operational procedure in the second operational procedure, control the communication device to send guide information to the second image forming apparatus, the guide information indicating guide-display of the next operational procedure in the second operational procedure.

2. The information processing apparatus according to claim 1, wherein the communication device is configured to receive identifier information of the second image forming apparatus, and the controller circuit is configured to, where the second image forming apparatus specified based on the identifier information is different from the first image forming apparatus of the specified user, determine whether or not the first operational procedure is different from the second operational procedure.

3. An information processing method, comprising:

storing, for each user, a first image forming apparatus usually used, a print setting usually used in the first image forming apparatus, and a first operational procedure, the first operational procedure being a procedure for selecting the print setting via a user interface of the first image forming apparatus, the print setting being a combination of multiple variable items;

receiving authorization information of a user from a second image forming apparatus;

receiving information of one variable item selected by the specified user, the information being sent from the second image forming apparatus every time the specified user selects one variable item via the user interface of the second image forming apparatus;

every time information of one variable item is received, determining whether or not a next operational procedure in the first operational procedure is different from a next operational procedure in a second operational procedure, the second operational procedure indicating a procedure for selecting the print setting of the specified user via a user interface of the second image forming apparatus; and where the next operational procedure in the first operational procedure of a user specified based on the authorization information is different from the next operational procedure in the second operational procedure, sending guide information to the second image forming apparatus, the guide information indicating guide-display of the next operational procedure in the second operational procedure.

4. A non-transitory computer readable recording medium that stores a program that causes a computer to execute an information processing method including:

storing, for each user, a first image forming apparatus usually used, a print setting usually used in the first image forming apparatus, and a first operational procedure, the first operational procedure being a procedure for selecting the print setting via a user interface of the first image forming apparatus, the print setting being a combination of multiple variable items;

receiving authorization information of a user from a second image forming apparatus;

receiving information of one variable item selected by the specified user, the information being sent from the second image forming apparatus every time the specified user selects one variable item via the user interface of the second image forming apparatus;

every time information of one variable item is received, determining whether or not a next operational procedure in the first operational procedure is different from a next operational procedure in a second operational procedure, the second operational procedure indicating a procedure for selecting the print setting of the specified user via a user interface of the second image forming apparatus; and where the next operational procedure in the first operational procedure of a user specified based on the authorization information is different from the next operational procedure in the second operational procedure, sending guide information to the second image forming apparatus, the guide information indicating guide-display of the next operational procedure in the second operational procedure.

* * * * *